Patented July 2, 1935

2,006,895

UNITED STATES PATENT OFFICE 2,006,895

INSECTICIDES AND FUNGICIDES AND PROCESS OF MAKING THE SAME

Robert H. Hurt, Charlottesville, Va.

No Drawing. Application August 8, 1933, Serial No. 684,289

14 Claims. (Cl. 167—20)

This invention relates to insecticides and fungicides and more particularly to an improved sulfur-containing spray material and the process of preparing the same.

The principal object of this invention is to provide improved insecticides and fungicides which are highly effective in combatting insects and fungous growth on plant life and, at the same time, harmless to plant tissue.

An important object of the invention is to provide a sulfur-containing insecticidal and fungicidal spray material which possesses the advantages of sulfur-containing spray materials heretofore used without being subject to the disadvantages of such materials.

A further object of the invention is to provide a standard sulfur insecticide and fungicide which is effective in its action and which is economical of production.

A further object of the invention is to provide a process of preparing a precipitated sulfur spray material in situ in a spray tank.

A further object of the invention is to provide a process of precipitating sulfur in a spray tank from a lime-sulfur solution without the production of by-products which are harmful to plant tissue.

A further object of the invention is to provide a process of precipitating sulfur from a lime-sulfur solution in a spray tank with the concurrent production of a by-product having ovicidal properties.

A further object of the invention is to produce a material capable of precipitating sulfur from a solution of soluble calcium sulfides, such as a lime-sulfur solution, with the formation of reaction products which are harmless to plant tissue.

Other objects and advantages of the invention will become apparent during the course of the following description.

As is well known, sulfur has long been recognized as a valuable constituent of insecticides and fungicides and the most commonly employed insecticidal and fungicidal composition have included sulfur compounds as active ingredients. For many years, the so-called "lime-sulfur" has been one of the most widely used fungicides. However, the use of lime-sulfur solutions has been attended with certain recognized disadvantages, particularly the burning effect on certain plant tissue when the solution is of sufficient concentration to provide proper fungicidal control.

In order to overcome the disadvantages attending the use of lime-sulfur solutions, while at the same time retaining the effectiveness of sulfur-containing compositions, extensive researches and experiments have been conducted and numerous sulfur-containing substitutes for the ancient lime-sulfur solutions have been proposed. One of these substances which has enjoyed some success in recent years is precipitated sulfur prepared as a so-called "wettable sulfur". While the various wettable sulfur compositions have produced partially satisfactory results, several disadvantages have accompanied the use of these materials. In the first place, although the precipitated sulfur fungicides have generally been found to be harmless to plant tissue, they are often incapable of producing a satisfactory degree of fungicidal control. Moreover, the users of precipitated sulfur as heretofore prepared have experienced difficulty in preparing a uniform spray material due to the trouble encountered in dispersing the precipitated sulfur throughout the water or aqueous medium in a spray tank. Moreover, the numerous wettable sulfur compositions offered on the market vary so greatly in their fungicidal value and price per unit that purchasers have been at a loss to know which composition to obtain for their particular purpose and to provide a standard spray.

With a knowledge of both the advantages and disadvantages of the sulfur-containing insecticides and fungicides heretofore employed, and also with the knowledge of the average fungicide user's preference for employing lime-sulfur solutions because of his familiarity with the same, I have conducted an extensive research for the purpose of providing a way in which there can be simply and effectively produced from a lime-sulfur solution in a spray tank an insecticide and fungicide which is entirely effective in providing proper insecticidal and fungicidal control and, at the same time, is harmless to plant tissue. As a result of this research I have developed a new process for producing the desired result and have also discovered a reagent for precipitating sulfur in a spray tank from a lime-sulfur solution, not only without the production of by-products which are harmful to plant tissue but with the production of a by-product which has ovicidal properties.

One of the important features of the present invention is the precipitation of sulfur in a spray tank ready for use in treating plant growth. While spray materials have heretofore been prepared by adding precipitated sulfur to an aqueous medium in a spray tank, no proposal has heretofore been made, as far as I am aware, for precipitating the sulfur in the liquid spraying medium in the spray tank. Of course, there are various known methods of precipitating sulfur from solutions of sulfur compounds. However, these methods ordinarily involve the use of treating materials, or result in the production of reaction products, which would be harmful to plant tissue. As far as I am aware, no safe and effective method has heretofore been developed for precipitating sulfur in a spray tank ready for use as a fungicide from a solution of sulfur compounds.

I have discovered that sulfur can be precipitated from a solution of sulfur compounds, such as a solution of calcium polysulfides, by adding thereto a reagent which I term sulfonated water gas creosote oil. In the production of this reagent I treat water gas creosote oil, which is a known by-product in the manufacture of water gas, with strong sulfuric acid, preferably concentrated commercial sulfuric acid. Water gas creosote oil of various boiling fractions are obtainable from water gas manufacturing plants, but I prefer to employ those fractions boiling between 200° C. and 350° C., although lighter or heavier fractions may be used with a reasonable degree of success. The water gas creosote oil is mixed with commercial sulfuric acid and the reaction is allowed to go to completion, which ordinarily requires two or three hours. In order to effect satisfactory reaction the materials are preferably agitated to insure thorough mixing. The amount of sulfuric acid employed will, of course, depend upon the particular material under treatment. However, I have found that any proportion of acid may be used up to the point where some acid would not be reacted upon and would be left to separate out. This point can be readily determined by simple tests. In practice I have found that the best results are obtained by mixing concentrated sulfuric acid with water gas creosote oil having a boiling fraction between 200° C. and 350° C. in the proportions of from 25 to 34 parts of acid to 66 to 75 parts, by volume, of water gas creosote oil. After the materials are mixed and agitated in a suitable container and the reaction permitted to go to completion, the agitation is stopped and the mass is allowed to stand. Upon standing, a thick flowing liquid settles out and may be separated from the oil layer which rises to the top. This thick flowing liquid which is of complex chemical formation is essentially a sulfonated water gas creosote oil and I have so termed it.

In the use of my new reagent in the preparation of insecticidal and fungicidal spray materials, the reagent is added to a solution of a sulfur salt which upon reaction with the reagent to precipitate sulfur therefrom does not produce materials which are harmful to plant life. In preferred practice, the sulfonated water gas creosote oil is added to a solution of a sulfur salt which upon reaction with the reagent produces an insoluble salt and yields precipitated sulfur. Any soluble calcium sulfide, such as one of the calcium polysulfides, is suitable for preparing the sulfur salt solution. However, I prefer to add the reagent to a lime-sulfur solution since lime-sulfur is readily available on the market at a reasonable price. Moreover, in the commercial practice of the invention the use of lime-sulfur solutions is advisable since farmers and horticulturists are thoroughly acquainted with the preparation and use of lime-sulfur solutions and they experience no difficulty in preparing such solutions and adding thereto the sulfonated water gas creosote oil in the proper amount.

An illustrative example of the preparation of a fungicidal and insecticidal spray in accordance with the present invention is as follows:

Approximately 2½ gallons of standard lime-sulfur, i. e. a 32 Baumé solution of polysulfides, are mixed with 97½ gallons of water in a spray tank. To this solution is added ½ gallon of sulfonated water gas creosote oil made by reacting 25 parts of concentrated commercial sulfuric acid with 75 parts, by volume, of a fraction of water gas creosote oil boiling between 200° C. and 350° C. If desired the sulfonated water gas creosote oil may be first added to the water and the concentrated lime-sulfur subsequently added. As is usual, the spray material is agitated in the spray tank. Upon the mixing of the materials in the spray tank, sulfur is precipitated in very finely divided form along with a semi-solid organic mass having ovicidal properties and a mineral precipitate which is essentially calcium sulfate. If desired, other materials such as lime or arsenicals, which are commonly used with sulfur fungicides, may be added.

In some instances it may be desired to have the spray material contain a substantial proportion of lime-sulfur solution which has not been reacted upon by the sulfonated water gas creosote oil to precipitate the sulfur therefrom and such a spray can readily be prepared by using an excess of the concentrated lime-sulfur. The amount of lime-sulfur to be used will depend upon the kind of plant or fruit which is to be sprayed, the season of the year, and other recognized factors familiar to the users of fungicides and insecticides.

While, ordinarily, the final spray material to be used in treating plant life will be prepared by the user in his spray tank shortly prior to spraying, it will be apparent that a spray material in concentrated form may be supplied for use upon dilution with water. However, in preferred practice, the sulfonated water gas creosote oil is supplied to the user (in steel or wooden barrels) to be employed by him in preparing the final spray material. Obviously, no difficulty will be encountered by the user in obtaining at all times a standard sulfur fungicide since a standard lime-sulfur concentrate is readily obtainable and by adding to water a predetermined amount of this concentrate and a predetermined amount of the sulfonated water gas creosote oil a standard product is simply and easily obtainable.

While I have described in detail the preferred practice of my invention it is to be understood that the details of procedure may be variously modified without departing from the spirit of the invention or the scope of the subjoined claims.

I claim:

1. The process of preparing an insecticide and fungicide which comprises adding sulfonated water gas creosote oil to a solution of a soluble sulfur salt capable of yielding an insoluble salt upon reaction to precipitate sulfur therefrom.

2. The process of preparing an insecticide and fungicide which comprises adding sulfonated water gas creosote oil to a solution of a soluble calcium sulfide.

3. The process of preparing an insecticide and fungicide which comprises adding sulfonated water gas creosote oil to a solution of calcium polysulfides.

4. The process of preparing an insecticidal and fungicidal spray material in situ in a spray tank which comprises mixing in said spray tank sulfonated water gas creosote oil and a solution of a soluble sulfur salt which upon reaction with said sulfonated water gas creosote oil yields an insoluble salt.

5. The process of preparing an insecticidal and fungicidal spray material in situ in a spray tank which comprises mixing in said spray tank sulfonated water gas creosote oil and a solution of a soluble calcium sulfide.

6. The process of preparing an insecticidal and fungicidal spray material in situ in a spray tank which comprises mixing in said spray tank sulfonated water gas creosote oil and a solution of calcium polysulfides.

7. In a process of combatting insects and fungous growth on plant life wherein precipitated sulfur in aqueous suspension is sprayed from a spray tank on said plant life, the improvement which comprises effecting the precipitation of sulfur in situ in the spray tank in the presence of an aqueous medium and spraying the resulting suspension on the plant life to be treated.

8. An insecticidal and fungicidal spray material comprising the reaction products of a soluble sulfur salt capable of yielding an insoluble salt upon reaction to precipitate sulfur therefrom and sulfonated water gas creosote oil in an aqueous medium.

9. An insecticidal and fungicidal spray material comprising the reaction products of a soluble calcium sulfide and sulfonated water gas creosote oil in an aqueous medium.

10. An insecticidal and fungicidal spray material comprising a lime-sulfur solution having suspended therein the products from the reaction of sulfonated water gas creosote oil with calcium polysulfides.

11. A reagent for producing from solutions of soluble calcium sulfides spray materials containing precipitated sulfur, which comprises sulfonated water gas creosote oil.

12. The process of preparing an insecticide and fungicide which comprises adding strong sulfuric acid to water gas creosote oil, allowing the mass to stand to permit the resulting acidified reaction product to settle, separating said product, and adding the same to a solution of a soluble sulfur salt capable of yielding an insoluble salt upon reaction with said acidified reaction product to precipitate sulfur therefrom.

13. The process of preparing an insecticide and fungicide which comprises sulfonating water gas creosote oil by treating the same with concentrated sulfuric acid, and adding said sulfonated product to a solution of calcium polysulfides.

14. In the production of an insecticide and fungicide, the step which comprises treating water gas creosote oil with concentrated sulfuric acid.

ROBERT H. HURT.